United States Patent

Echtle et al.

[11] Patent Number: 5,906,183
[45] Date of Patent: May 25, 1999

[54] METHOD OF FORMING AN FUEL/AIR MIXTURE IN A DIRECT INJECTION INTERNAL COMBUSTION ENGINE

[75] Inventors: Harald Echtle, Gengenbach; Horst Hanauer, Althütte; Werner Rumez, Mühlacker; Erwin Schmidt, Baltmannsweiler; Siegfried Sumser, Stuttgart, all of Germany

[73] Assignee: Daimler-Benz A.G., Stuttgart, Germany

[21] Appl. No.: 09/046,526

[22] Filed: Mar. 24, 1998

[30] Foreign Application Priority Data

Mar. 25, 1997 [DE] Germany ............................ 197 12 357

[51] Int. Cl.⁶ ..................................................... F02B 31/08
[52] U.S. Cl. ............................ 123/301; 123/302; 123/308
[58] Field of Search .................... 123/301, 308, 123/302, 585, 531, 533

[56] References Cited

U.S. PATENT DOCUMENTS

| | | |
|---|---|---|
| 2,882,873 | 4/1959 | Witzky . |
| 3,395,690 | 8/1968 | Riley ........................................ 123/301 |
| 3,418,981 | 12/1968 | Von Seggern et al. . |
| 3,590,789 | 7/1971 | Wiebicke ................................ 123/301 |
| 4,193,382 | 3/1980 | Oshima ................................... 123/295 |
| 4,231,339 | 11/1980 | Matsumoto et al. ..................... 123/308 |
| 4,270,500 | 6/1981 | Nakagawa et al. . |
| 4,313,410 | 2/1982 | Kunii et al. ............................. 123/531 |
| 4,422,430 | 12/1983 | Wiatrak ............................. 123/568.13 |
| 4,446,830 | 5/1984 | Simko et al. . |
| 4,453,502 | 6/1984 | Resler, Jr. . |
| 4,763,624 | 8/1988 | Deckers . |
| 4,969,446 | 11/1990 | Olsson et al. ............................ 123/585 |
| 5,666,916 | 9/1997 | Fujieda et al. .......................... 123/295 |

FOREIGN PATENT DOCUMENTS

| | | |
|---|---|---|
| 0 473 931 A2 | 3/1992 | European Pat. Off. . |
| 42 09 684 A1 | 9/1993 | Germany . |
| 55-37550 | 3/1980 | Japan . |
| 56-156415 | 3/1981 | Japan . |
| 56-64144 | 6/1981 | Japan . |
| 57-46018 | 3/1982 | Japan . |
| 4-311621 | 4/1992 | Japan . |
| 2 296 037 | 6/1996 | United Kingdom . |
| 2 296 527 | 7/1996 | United Kingdom . |

OTHER PUBLICATIONS

Automotive Engineering, Feb.2,1987, No. 2, pp. 170–171.
ATZ Automobiltechn. Zeitschrift 88 (1986) 5, p. 302.

*Primary Examiner*—Erick R. Solis
*Attorney, Agent, or Firm*—Klaus J. Bach

[57] ABSTRACT

In a method of forming a fuel/air mixture in an internal combustion engine with direct fuel injection, wherein a combustion air flow is admitted to each cylinder through at least one intake passage tangentially to the cylinder wall such that a combustion air spin flow about the cylinder axis is formed in the combustion chamber and fuel is injected into the combustion chamber in a fuel beam extending along the cylinder axis, at least one additional fluid stream is added to the combustion air flow in the intake passage at the side of the intake passage opposite the direction of the spin flow in the combustion chamber so as to provide an additional spin impulse to the combustion air in the combustion chamber.

11 Claims, 4 Drawing Sheets

METHOD OF FORMING AN FUEL/AIR MIXTURE IN A DIRECT INJECTION INTERNAL COMBUSTION ENGINE

BACKGROUND OF THE INVENTION

The invention relates to a method of forming a fuel/air mixture in an internal combustion engine with an air intake passage for each cylinder through which air enters the cylinder tangentially under the control of an intake valve disposed in the intake passage and a fuel injector which injects fuel into the cylinder for mixture with the air.

For forming the fuel air mixture in the combustion chamber of each cylinder which is delimited by a piston of the internal combustion engine, an injector injects fuel into the combustion chamber. The combustion air required for forming a combustible mixture is supplied to the combustion chamber by way of at least one intake passage. Admission of the combustion air to the combustion chamber is controlled by an intake valve disposed in the intake passage.

U.S. Pat. No. 2,882,873 discloses an arrangement wherein the combustion air is admitted to the combustion chamber in a flow path which is about tangential to a cylinder wall such that the air spins about the cylinder axis at high speed. Friction of the combustion air at the cylinder wall generates an inwardly directed secondary flow. Adjacent the cylinder wall, the air flow is slowed down by the friction and accordingly is subject to reduced centrifugal forces but subject to the pressure generated by the centrifugal forces experienced by the fast flowing adjacent air layers spinning about the cylinder axis. This generates the secondary air flow along the combustion chamber wall toward the low pressure area in the center of the combustion chamber. Some of the fuel injected into the combustion chamber for mixture with the combustion air is carried by the secondary air flow along the combustion chamber walls to the center of the combustion chamber such that a relatively rich fuel/air mixture is formed in the center of the combustion chamber. The inhomogeneous distribution of the mixture in the combustion chamber results in an increased power output since the compression ratio of the engine can be increased. In addition, a mixture with a localized rich fuel/air mixture reduces fuel consumption and exhaust emissions particularly during partial load operation of the engine. This is especially true for the operation of gasoline internal combustion engines with direct fuel injection since, by forming a relatively rich fuel mixture in the center of the combustion chamber during partial load operation, the electrodes of a spark plug which generally project into the center of the combustion chamber are surrounded by a relatively rich, easily ignitable mixture so that complete combustion of the combustion chamber charge is facilitated.

The intensity of the secondary flow which is required for the return of fuel centrifuged out of the spinning air into the secondary flow along the combustion chamber wall back to the center of the combustion chamber to form the relatively rich mixture depends on the circumferential speed of the air spinning along the cylinder wall. With increasing speed of the air along the cylinder wall, the frictional forces along the cylinder wall increase and the deceleration of the air in the boundary layer along the cylinder wall increases proportionally. The centripetal force which causes the secondary flow and which corresponds to the difference between the centrifugal force of the spinning air flow and the radial pressure gradient accordingly increases proportionally with the circumferential speed of the spinning flow. In the internal combustion engine known from the reference, the spin flow about the cylinder axis is generated by guiding the combustion air in the end section of the air intake passage such that the air enters the combustion chamber in a tangential fashion. The air is guided by a corresponding arrangement and shape of the air intake passage, the shape of the intake valve which includes a guide structure and by guide baffles in the intake passage adjacent the intake valve. Because of the geometrically predetermined guide means for the combustion air flow the speed of spinning flow in the combustion chamber depends exclusively on the air flow volume in the intake passage. However, the combustion air volume required for forming the mixture is predetermined that is it is limited so that, for a wide performance graph range of the internal combustion engine, the reqired intensity of the spin flow and the secondary air flow for forming a fuel/air mixture of optimal quality for the respective engine operating point can not be reached. As a result, the fuel consumption and exhaust gas emissions are relatively high.

It is therefore the object of the present invention to provide a method of forming a fuel/air mixture in an internal combustion engine with direct fuel injection whereby a fuel/air mixture of optimal quality is generated at every operating point of the engine particularly with a view to achieving a combustion with low fuel consumption and low exhaust emission values.

SUMMARY OF THE INVENTION

In a method of forming a fuel/air mixture in an internal combustion engine with direct fuel injection, wherein a combustion air flow is admitted for each cylinder through at least one intake passage to its combustion chamber tangentially to the cylinder wall such that a combustion air spin flow about the cylinder axis is formed in the combustion chamber and fuel is injected into the combustion chamber in a fuel beam extending along the cylinder axis, at least one additional fluid stream is added to the combustion air flow in the intake passage at the side of the intake passage opposite the direction of the spin flow in the combustion chamber so as to provide an additional spin impulse to the combustion air in the combustion chamber.

The fluid flow added to the combustion air flow in the entrance area of the combustion chamber in the direction of the spin flow, actively enhances the spin flow in the combustion chamber around the cylinder axis. The angular momentum added to spin flow depends on the mass flow of the additional fluid flow and can therefore be controlled. With an optimal admission point for the additional fluid into the intake passage a relatively small additional fluid volume is sufficient to control the combustion air flow entering the combustion chamber in such a way that a spin flow with optimal flow speed is generated. Accordingly, the intensity of the spin flow is adjustable for any engine operating point to provide, together with the secondary air flow, an optimal fuel/air mixture. The high spin speeds generate strong centripetal secondary air flows adjacent the piston and the cylinder top wall which result from the friction of the air flow at the cylinder surfaces and the piston and the cylinder head top surfaces delimiting the combustion chamber. For continuity reasons, these secondary air flows cause upwardly and downwardly directed flows in the center of the combustion chamber. As a result, the fuel injected into the combustion chamber for forming the fuel/air mixture is carried from the areas adjacent the cylinder wall and the piston top surface to the center of the combustion chamber thereby forming a mixture with excellent combustion properties.

The combustion air flow can be influenced with a view to generating a desired spin flow in a controlled manner particularly if a fluid flow is added adjacent the intake valve and an additional fluid flow is added at an axial distance from the intake valve.

In a particular embodiment of the invention, the formation of the spin flow by the combustion air entering the combustion chamber is further enhanced by extracting air from the combustion chamber in an area adjacent the intake passage opening to the combustion chamber at the upstream end of the intake passage opening—in the direction of the spin flow. The air may be sucked out at a point adjacent the intake valve opposite the admission point for the additional air.

Preferably, a control unit determines, at any operating point of the engine, the respective mass flow of the additional fluid flows and, respectively, the extraction flows in order to provide an optimal spin flow for the mixture formation. The control unit may continuously receive as control values the operating parameters of the engine such as the emission values measured in the exhaust system of the engine. As additional fluid, exhaust gas, air or other fluids may be added to the combustion air flow depending on the engine operating point and the mixture composition required.

An embodiment of the invention will be described in greater detail below on the basis of the accompanying drawings.

DESCRIPTION OF AN EMBODIMENT OF THE INVENTION

Figure 1:
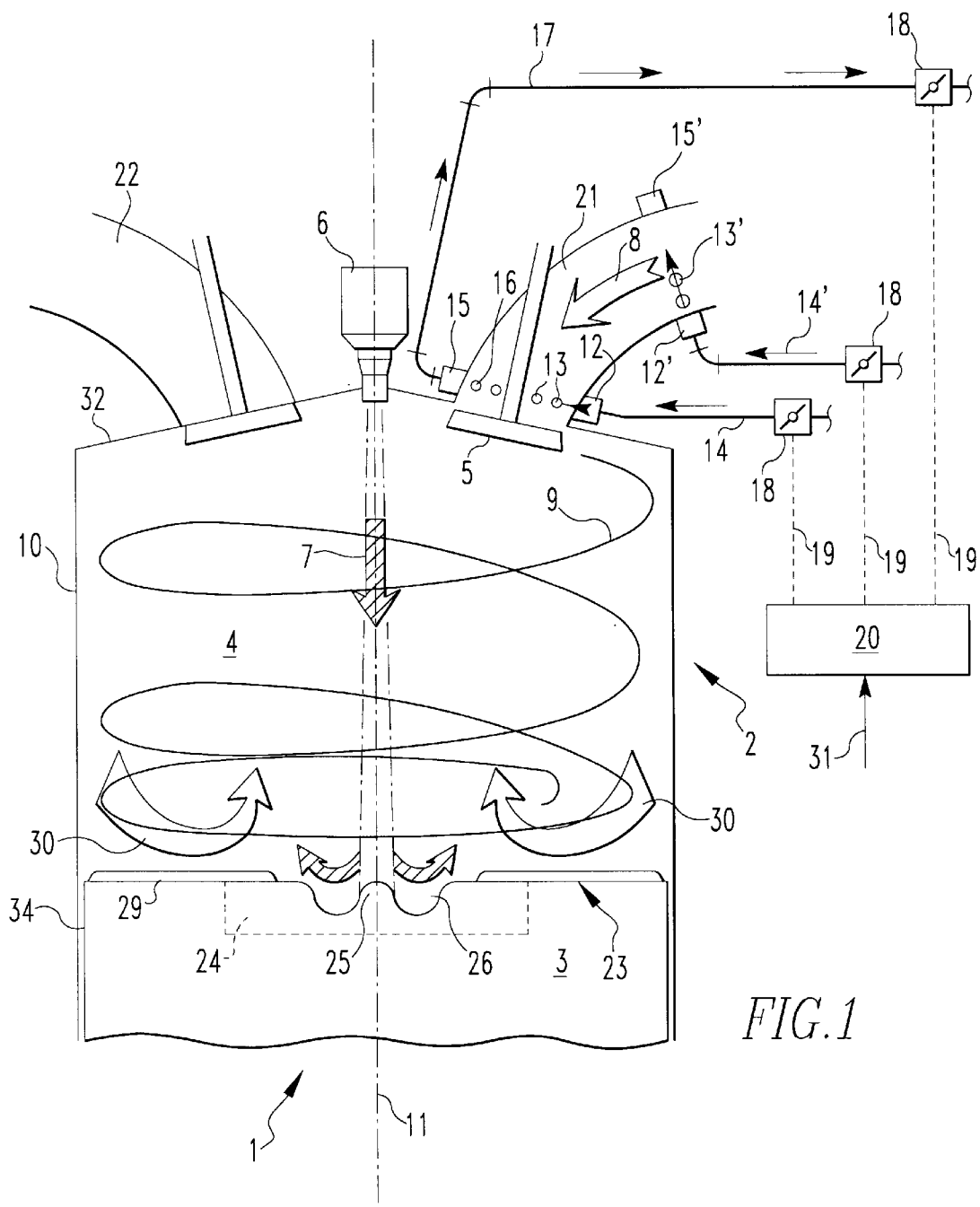
FIG. 1 shows schematically in an axial cross-sectional view of a cylinder the fuel and combustion air flow during the mixture formation.

FIG. 1 is an axial cross-sectional view of a cylinder 2 of an internal combustion engine 1 with direct fuel injection. It includes a piston 3, which is longitudinally movably supported in the cylinder by a cylinder wall 10 and delimits a combustion chamber 4. With each cycle of the engine, an ignitable air/fuel mixture is formed in the combustion chamber 4 which is combusted for driving the piston 3. The combustion air needed for forming the mixture in the combustion chamber 4 is supplied by way of intake passages 21 which are controlled each by an intake valve 5 so as to be opened during the intake stroke of the piston 3. An injector 6 is disposed centrally in the combustion chamber top wall 32 and injects the fuel into the combustion chamber 4 with a fuel beam 7 directed toward the piston 3 coaxially with the cylinder axis 11. The fuel beam 7 impinges onto an impingement element 24 in the piston top wall 23 and is reflected thereby, guided by a central beam divider 25 and an annular deflection trough 26 surrounding the beam divider 25, back into the combustion chamber 4. In the process, the reflected fuel is atomized in the combustion air distributed in the combustion chamber 4.

The combustion air is admitted to the combustion chamber 4 about tangentially to the cylinder wall 10 such that a spin flow 9 about the cylinder axis 11 is generated in the combustion chamber 4. The combustion chamber top wall 32 includes two intake passages 21, which are arranged behind one another in a circumferential direction of the cylinder 2 and which together admit the combustion air required for forming the mixture in two combustion air flows 8 which are both oriented in the flow direction of the air spin flow 9 in the combustion chamber 4. As a result of the rotation of the spin flow 9 in the combustion chamber 4, there is, generated by the centrifugal forces, a positive pressure gradient in the combustion chamber charge directed toward the cylinder wall 10. Friction forces occurring at the cylinder wall 10 and on the piston top wall 23 form a slowed-down boundary layer. As a result of a force equalization between the positive pressure gradient and the reduced centrifugal forces in the boundary layer inwardly directed secondary air flows 30 are generated which are particularly intense in the area of the piston top wall 23. The secondary air flow 30 into the center of the combustion chamber is supported by radial spirally extending guide structures 29 which are disposed on the piston top wall 23 and extend suitably in the desired flow direction of the secondary air flow toward the cylinder axis 11. The secondary air flow 30 which is particularly strong in the combustion chamber 4 adjacent the piston generate, for continuity reasons, an upwardly directed chimney flow toward the top wall 32 of the combustion chamber 4. The fuel injected into the combustion chamber is therefore atomized in the combustion air so as to form a mixture and is enriched in the center of the combustion chamber 4 by the secondary air flow 30. The secondary air flow along the combustion chamber top wall 32 generates in the center of the combustion chamber a chimney flow which is directed downwardly toward the piston top wall 23 whereby the rich fuel/air mixture is held in the center of the combustion chamber. With the strong spin flow 9, and the correspondingly strong secondary flows 30 an at least locally combustible fuel/air mixture can be formed at every operating point of the internal combustion engine. The upwardly directed chimney flow directed toward the combustion chamber top wall 32 enhances the formation of the mixture by the compression stroke of the piston 3 and inhibits fuel deposition on the piston top wall. Particularly during partial load operation of gasoline engine, it is therefore possible to provide an ignitable mixture at one or several spark plugs which is or are normally mounted into the combustion chamber top wall 32.

For a fuel consumption- and exhaust gas emission optimized combustion for every operating point of the internal combustion engine, a mixture formation with a spin flow 9 of a certain speed is required. The spin flow around the cylinder axis 11 is generated by the air flow 8 leaving the intake passage 21 which provides for a spin impuls in the desired direction.

In addition, to this base impulse, which is imparted to the combustion air flow 8 by admission of the air tangentially to the cylinder wall 10 (see FIG. 2) and the geometry of the curved intake passage 21 at the end adjacent the intake valve, the formation of the spin flow 9 about the cylinder axis 11 is improved by an aerodynamic influence on the combustion air flow 8 in the intake passage 21. In this case, additional fluid streams 12, 12' are added in the entrance area of the intake passage 21 to the combustion chamber 4 to the combustion air flow 8 at the upstream side of the spin flow 9. An additional fluid flow 12 is admitted in the entrance area of the inlet passage 21 adjacent the valve 5 through a supply lines 14 and openings 13 and another additional fluid flow 12' is admitted to the intake passage 21 through a supply line 14' and openings disposed at a distance from the intake valve 5.

The additional flows 12, 12' direct the combustion air flow 8 entering the combustion chamber 4 with high efficiency in the desired tangential direction with respect to the cylinder wall 10 although their mass flow volume is small as compared to that of the combustion air flow 8. In addition, the flow direction of the combustion air flow 8 is influenced by the extraction of an extraction air flow removed in the entrance area of the air intake passage 21 by way of openings 15, 16. The extraction flow is sucked out of the combustion air flow 8 at the side of the air intake passage 21 directed toward the spin flow direction. The extraction location is in the entrance area of the air intake passage 21 about opposite the locations where the additional fluid stream 12 is admitted to the air intake passage 21.

The respective additional air mass flows 12, 12' as well as the extraction air flow through the extraction line 17 are controlled by a control unit 20 depending on the operating point of the internal combustion engine. By accurately controlling the additional air flows and the extraction air flow, the circumferential speed of the spin flow 9 about the cylinder axis 11 can be adjusted accurately so as to be suitable for a particular engine operating point so that, with the resulting secondary air flows 30, an optimal mixture is generated in the combustion chamber 4. The complete combustion is maintained for example by measuring the exhaust gas quality in an exhaust passage 22 of the internal combustion engine 1, these values being used by the control unit 20 together with other engine operating parameters 31 supplied to the control unit 20. Based on the these parameters 31, the control unit 20 controls the respective air mass flows of the additional air flows 12, 12' and the extraction air flow and consequently, the spin flow 9 for forming an appropriate mixture. To this end, the control unit 20 supplies the appropriate control signals 19 to the respective valve 18.

As the additional fluid, recirculated exhaust gas, air or other fluids may be added to the combustion air flow 8 depending on the operating conditions of the internal combustion engine 1. Since separate additional fluid flows 12, 12' at axially spaced locations are provided to supply the fluid to the intake passage 21, different fluids can be supplied through the two fluid supply lines 14, 14'.

The active control of the spin flow 9 by the aerodynamic measures in the entrance area of the air intake passage into the combustion chamber 4 make it possible to control the mixture formation with different flow effects, particularly of the secondary flows 30 in the combustion chamber 4. The flow effects caused by the circulating spin flow 9 in the combustion chamber 4 are different above and below a critical value (Taylor number=41.3). With Taylor numbers<41.3, the secondary air flows 30 described earlier are generated which extend over the whole combustion chamber 4 and which are particularly strong adjacent the piston top wall 23. With Taylor numbers>41.3, additionally torus-like vortex trains develop adjacent the cylinder wall 10 in a center area about between the piston top wall 23 and the combustion chamber top wall 32 which are called Görtler vortexes. The vortex trains extend axially in the circumferential direction of the cylinder walls and rotate pair wise in opposite directions. Their diameter increases with increasing boundary layer thickness adjacent the cylinder wall 10 as a result of friction forces. The vortex trains collapse only at the end of the compression stroke of the piston 3 into small-cell structures. They generate a turbulence during the mixture formation which enhances the advancement of the flame front providing for an optimal combustion. The vortex trains retain limited amounts of fluids, for example added exhaust gas, in an area adjacent the cylinder wall 10. In this way, particularly a piston clearance space 34 between the piston and the cylinder wall 10 is closed at the end to the combustion chamber 4 which prevents fuel from entering the piston clearance space 34, that is, no fuel can escape the combustion process and produce poisonous hydrocarbon emissions of the internal combustion engine 1. The additional torus-like exhaust gas vortexes formed in the axial direction along the cylinder wall 10 keep the combustion chamber charge from the cylinder wall 10 and the oil film disposed thereon so that the lubricating oil on the cylinder wall is not diluted. With a variable spin flow 9 and the torus-like vortex effects corresponding to the combustion chamber configuration, the mixture formation and the exhaust gas emissions can be improved depending on the operating point of the internal combustion engine. Particularly during load changes, it is consequently possible to aerodynamically control the combustion air flow, so as to generate exactly that circumferential speed for the spin flow 9 which causes an optimal mixture and complete combustion.

The admission of the additional fluid and the extraction of the extraction air flow can be done efficiently in several partial flows. The partial flows are conducted through several admission openings 13, 13' and, respectively, several extraction openings 16 which are arranged in an annular array at the circumference of the air intake passage 21. The admission openings 13, 13' and the extraction openings 16 each are in communication with an annular passage structure 15, 15' of which one is arranged adjacent the intake valve 5 and the other is arranged at an axial distance therefrom. The admission openings 13, 13' of the annular passages structures 15, 15' are in communication with the respective fluid supply lines 14, 14'. The annular passage structure 15, which is in communication with the extraction openings 16 is connected to the extraction line 17.

Figure 2:
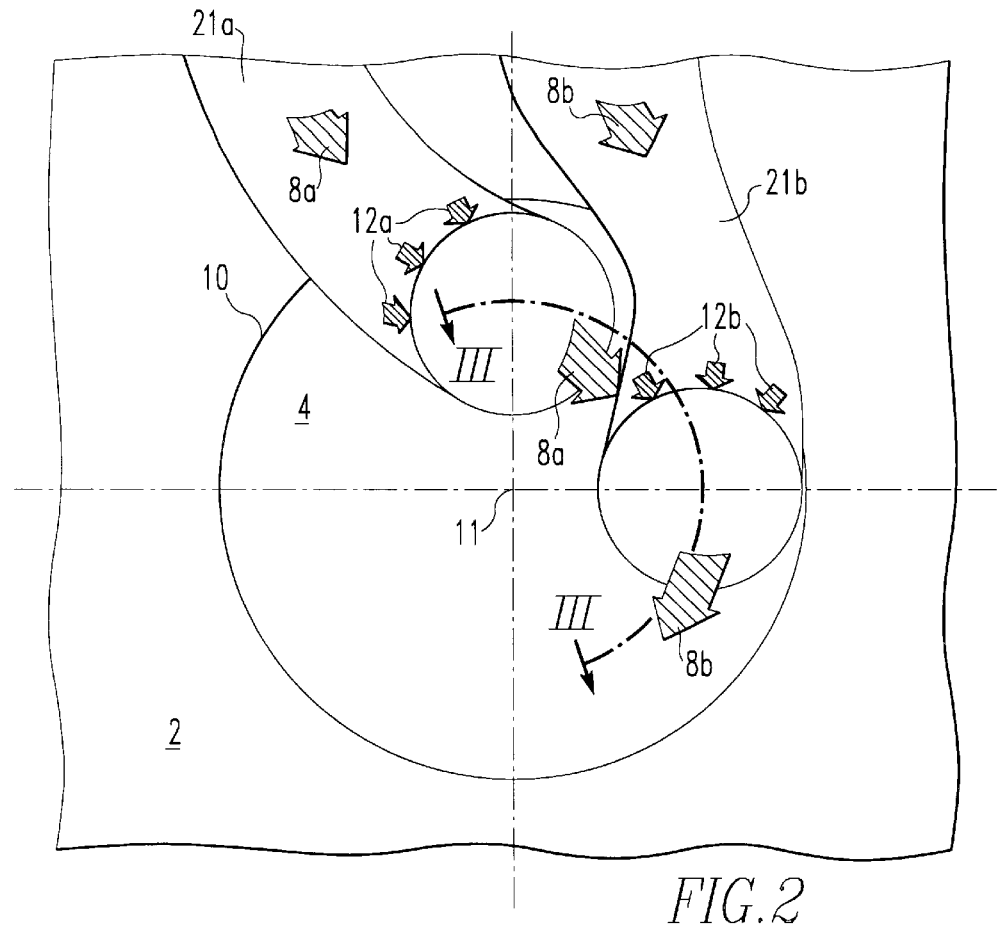
FIG. 2 is a schematic representation of a cylinder head in a radial cross-section.

The arrangement of the respective intake passage 21a, 21b, is shown in FIG. 2. A combustion air flow 8a, 8b is supplied to the combustion chamber through the intake passages 21a, 21b tangentially to the cylinder wall 10 as shown in the cross-sectional view of the combustion chamber 4 of the cylinder 2 represented in FIG. 2. The intake passages 21a, 21b are oriented in the same way with regard to the circumferential direction of the cylinder wall 10, that is, they extend essentially tangentially to the cylinder wall 10 so that the combustion air flows 8a, 8b entering the combustion chamber generate a spin flow 9 around the cylinder axis 11. The flow direction of the combustion air flows 8a, 8b is aerodynamically influenced by the addition of additional fluid streams 12a, 12b in the entrance area of the respective intake passage into the combustion chamber 4 in order to increase the spin flow in a controllable manner as described earlier. The additional fluid streams 12a, 12b are supplied to the combustion air flows 8a, 8b by way of several partial streams.

The combustion air flows 8a, 8b can be effectively redirected, that is controlled, thereby since the resulting vector of the flow direction of the respective partial streams can be so selected that it extends in the direction of the spin flow to be generated.

Figure 3:
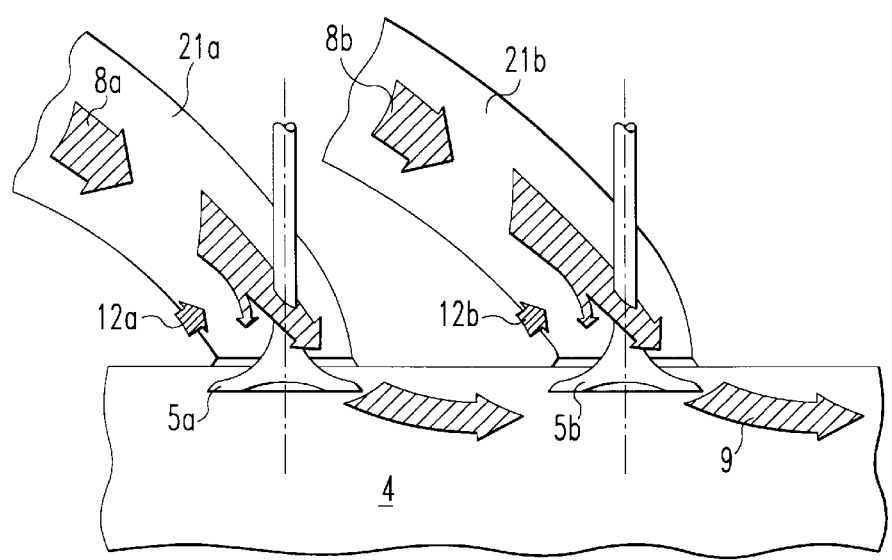
FIG. 3 is a cross-sectional view taken along line III—III of FIG. 2, FIG. 4 schematically shows the fuel injection into the combustion chamber at different positions of the piston.

FIG. 3 is a cross-sectional view taken along line III—III of FIG. 2 showing the effect of the additional fluid streams 12a, 12b into the intake passages 21a, 21b for the control of the spin flow 9 in the combustion chamber 4. When entering the combustion chamber 4, the combustion air flows pass the valve discs of the opened intake valves 5a, 5b wherein they are directed tangentially into the cylinder so as to generate a spin flow. The generation of the spin flow is enhanced by the admission of the additional fluid streams 12a, 12b, which are conducted into the intake passages 21a, 21b at least adjacent the intake valves 5a, 5b. In order to enhance the spin flow 9, the additional fluid streams 12a, 12b are admitted at the side of the combustion air flow 8a and 8b respectively, opposite the direction in which the combustion air flow enters the combustion chamber.

Figure 4:
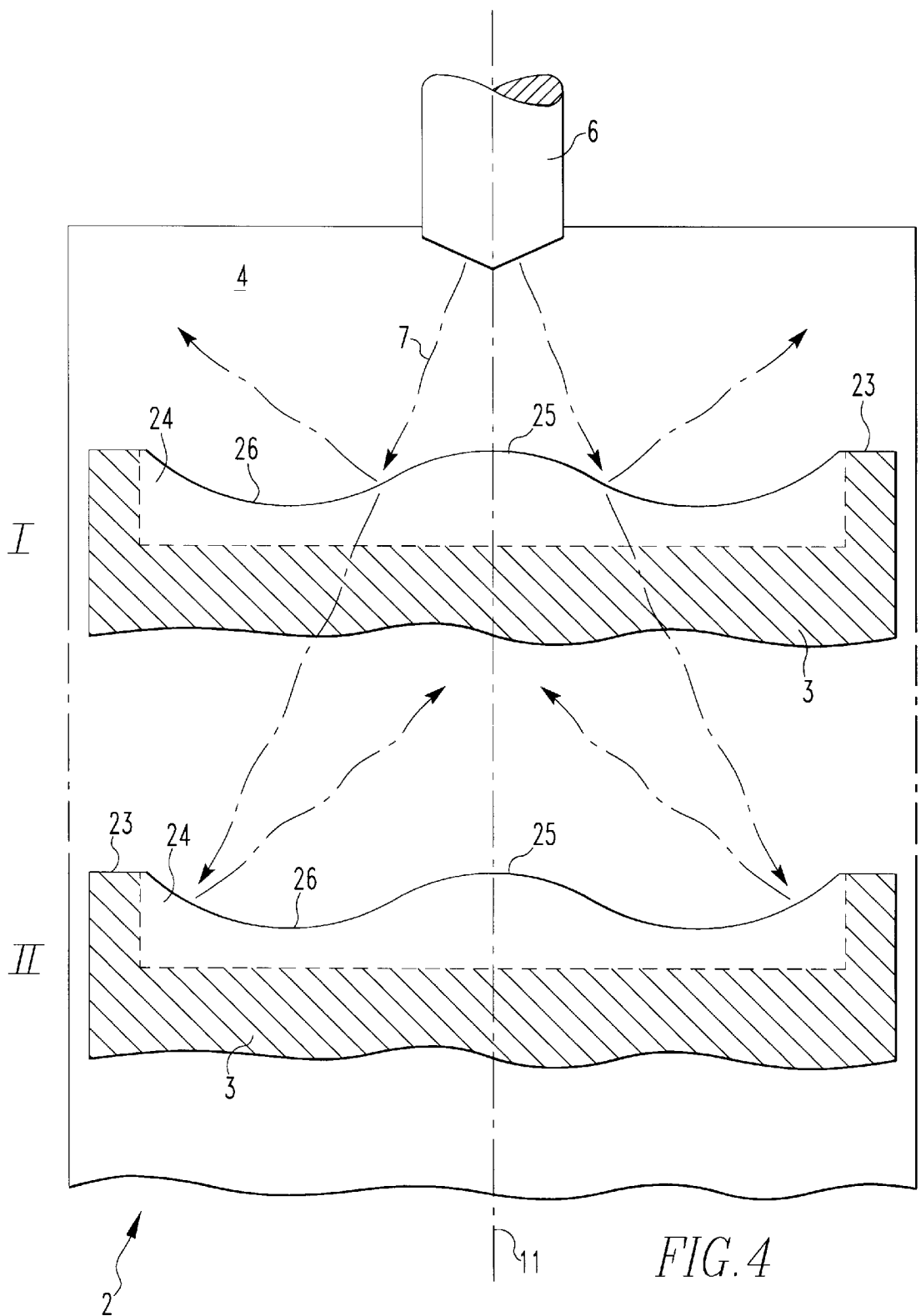
Figure 5A:
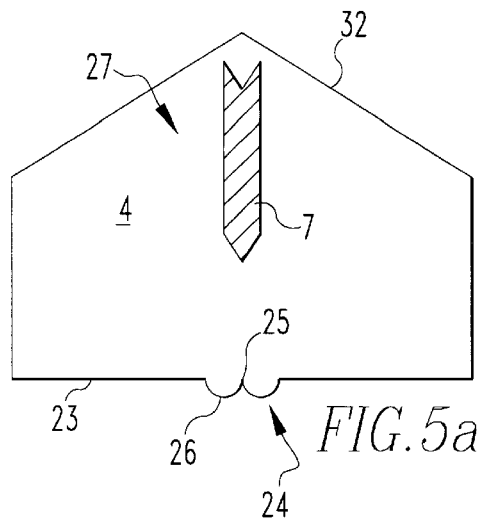
FIGS. 5a to 5e show subsequent phases of the fuel distribution during injection into the combustion chamber.
Figure 5B:
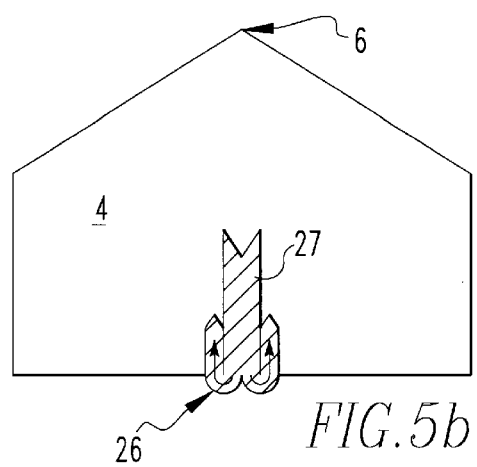
Figure 5C:
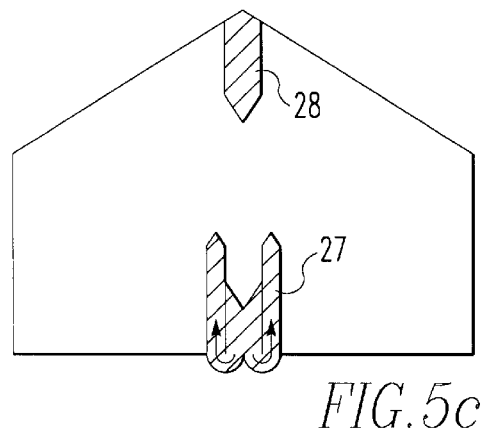
Figure 5D:
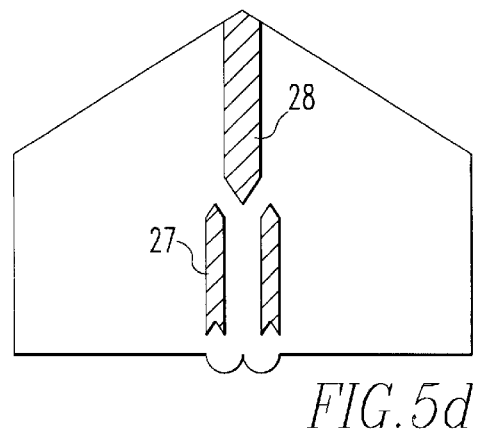
Figure 5E:
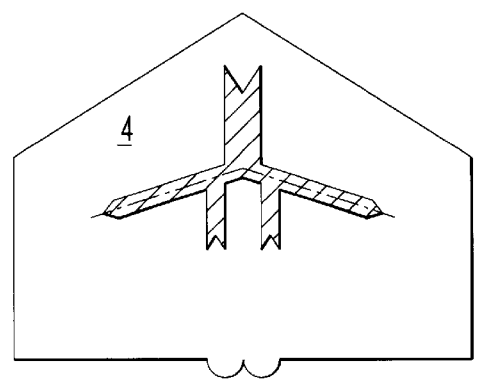

FIG. 4 shows schematically the injection of the fuel and its distribution during the formation of the mixture in the combustion chamber 4. The fuel is injected by a centrally arranged injector 6 which generates in the combustion chamber 4 a fuel beam 7 co-axially with the cylinder axis 11. Fuel injection takes place during the compression stroke of the piston 3 which is movably guided in the cylinder 2. As a result of the fuel injection during the compression stroke, the fuel beam 7 penetrates the center of the compression air which already forms a spin flow about the cylinder axis 11. Depending on the rotational speed of the spin flow and the centripetal secondary flow (FIG. 1), a mixture is formed in the combustion chamber 4 which is relatively rich in the center of the combustion chamber 4.

The various engine operating points have different injection timing assigned to them. During partial load operation fuel injection is relatively late in the compression stroke (piston position I) near the top dead center. With increasing engine load, the engine timing is increasingly earlier such that the piston 3 is at an increasingly greater distance from the injector 6 (piston position II). It is of course understood that, with increasing operating load, also the fuel injection volume is increased.

In any case, the injected fuel beam 7 impinges onto the upwardly moving piston 3 and is reflected back into the combustion chamber 4, while being atomized. In order to achieve a suitable fuel distribution in the combustion chamber 4 at every operating point of the internal combustion engine, the impingement surface for the fuel in the piston top wall 23 is so shaped that the impinging fuel beam 7 is reflected into the combustion chamber 4 in a guided manner. The impingement surface on the piston top wall 23 comprises a central beam divider 25 which is disposed on the cylinder axis 11. The beam divider 25 is surrounded by an annular deflection trough 26 which is disposed between the beam divider 25 and the outer part of the piston top wall 23 and has, in an axial cross-sectional plane of the piston, the shape of a Pelton guide surface. The fuel is reflected by the shape of the piston top wall 23 depending on the injection timing, that is, on the point in time when the fuel beam 7 impinges on the piston 3. If, at the time of injection, the piston 3 is in the position I close to the injector 6, the fuel beam 7 impinges on the beam divider 25 in the center area within the deflection trough 26 and consequently is reflected back into the combustion chamber 4 in a spread-out fashion. In this case, the fuel is distributed over a large part of the combustion chamber 4 to form a suitable fuel/air mixture with the combustion air spinning in the combustion chamber 4.

If the fuel beam is injected into the combustion chamber at an earlier point in time (piston position II), the fuel beam 7 which moves toward the piston 3 and in the process becomes wider, impinges on the outer side walls of the deflection trough 26 and is reflected thereby inwardly that is toward the cylinder axis 11. With the fuel so reflected inwardly toward the center of the combustion chamber, a relatively rich fuel/air mixture is formed in the center of the combustion chamber that is the effect of the spin flow around the cylinder axis 11 and the secondary flows resulting therefrom is enhanced. The deflection trough 26 furthermore prevents a detrimental collection of liquid fuel on the piston top wall 23 by returning the fuel back into the combustion chamber.

The impingement surface for the fuel beam on the piston top wall is formed by an impingement element 24 which is inserted into the piston top wall 23. The impingement element 24 has the described configuration required for the fuel deflection and atomization with a central beam divider 25 and an annular Pelton guide surface-like deflection trough 26.

During fuel injection, the fuel injection beam 7 is subjected to an impulse in opposition to the spin flow 9 of the combustion air in the combustion chamber 4. The opposite spin of the fuel beam 7 provides a cylindrical shear surface between the combustion air and the fuel beam which enhances the mixture formation.

When the fuel impinges on the beam divider 25 and the deflection trough which are wetted by the fuel a heat exchange between the piston 3 and the fuel takes place. In this way, the hot piston top wall 23 is cooled and the fuel is heated whereby its ignitability is improved.

FIGS. 5a to 5e illustrate a particularly advantageous way of injecting the fuel into the combustion chamber 4 for forming the mixture with the spin flow of the combustion air about the cylinder axis as described above. In this case, the fuel is injected by an injector, which is not shown in the drawings, from the combustion chamber top wall 32 toward the piston top wall 23 centrally into the combustion chamber 4. The impingement surface on the piston top wall 23 for the fuel beam 7 is formed by an impingement element 24 inserted into the piston top wall 23. The impingement element 24 includes a central beam divider 25 and an annular deflection trough 26 extending around the beam divider 25. The deflection trough 26 has a Pelton-type baffle shape such that the fuel beam 7 is divided by the beam divider 25 and deflected by the wall of the deflection trough 26 by an angle of about 180° so that the fuel is redirected into the combustion chamber 4 toward the injector. The fuel is injected in two partial amounts which are subsequently injected into the combustion chamber 4 during the compression stroke of the piston.

FIG. 5 shows the first phase of fuel injection into the combustion chamber 4, wherein the fuel beam 7 of an initial injection volume 27 is injected toward the impingement element 24 on the piston top wall 23. As shown in FIG. 5b, the initial injection volume 27 impinges on the impingement element 24 and is deflected by the deflection trough 26 back toward the injector 6. While the injection volume 27 is deflected on the piston top wall and is already moving back upwardly toward the combustion chamber top wall, the injector injects a main injection volume 28 into the combustion chamber 4 again centrally toward the piston. The initial injection volume 27 and the main injection volume 28 accordingly flow co-axially toward each other (FIG. 5d) and collide in the center of the combustion chamber 4 at a distance from the piston top wall 23 whereby the fuel is atomized and spread out in a direction which is about radial to the cylinder axis (FIG. 5e). with the division of the total fuel volume to be injected into an initial volume 27 and a main injection volume 28, the fuel is maintained in the center of the combustion chamber 4 for a relatively long period so that, together with the combustion air flows generated in the combustion chamber 4, mixtures can be formed which are optimized with respect to the various engine operating points.

What is claimed is:

1. A method of forming a fuel/air mixture in an internal combustion engine with direct fuel injection wherein a combustion air flow is admitted to each cylinder through at least one intake passage with an intake valve to a combustion chamber delimited by the cylinder wall, the combustion chamber top wall and a piston disposed in the cylinder, tangentially to the cylinder wall such that a combustion air spin flow around a cylinder axis is formed in the combustion chamber and an injector disposed in the combustion chamber top wall injects fuel into the combustion chamber, said method comprising the steps of supplying, in the direction of the spin flow in the combustion chamber, at least one additional fluid stream to the combustion air flow at the entrance area of the intake passage into the combustion chamber at the side of the intake passage opposite the direction of the spin flow in the combustion chamber so as to provide an additional spin impulse to the combustion air in the combustion chamber, and extracting an extraction stream from said intake passage in the entrance area of said intake passage to said combustion chamber at the side of the intake passage toward the spin flow direction.

2. A method according to claim 1, wherein said at least one additional fluid stream is introduced into said intake passage adjacent said intake valve and a second additional fluid stream is admitted to the intake passage at a distance from the intake valve.

3. A method according to claim 1, wherein said additional fluid streams are admitted and said extraction stream is extracted by way of partial streams through several annularly arranged admission openings and extraction openings.

4. A method according to claim 3, wherein the resultant vector of the flow directions of the partial fluid admission and extraction streams in the intake passage in a cross-sectional plane of the cylinder extends in the direction of the spin flow.

5. A method according to claim 1, wherein the flow volumes of the additional fluid streams and of the extraction stream are controlled by a control unit depending on the operating point of the internal combustion engine.

6. A method according to claim 1, wherein as additional fluid exhaust gas from the engine exhaust, selectively air or on other fluid is admitted to the combustion air flow depending on the engine operating condition.

7. A method according to claim 1, wherein the fuel is injected into the combustion chamber in a fuel beam directed from an injector centrally into the combustion chamber toward the piston.

8. A method according to claim 7, wherein said fuel beam is injected with a spin rotating in a direction opposite to the spin of the combustion chamber.

9. A method according to claim 7, wherein said fuel beam is directed onto an impingement element on said piston and is deflected by said impingement element back into the combustion chamber.

10. A method according to claim 7, wherein the fuel is injected into said combustion chamber during the compression stroke of the piston.

11. A method according to claim 9, wherein the fuel injected into the combustion chamber during each operating cycle is divided into an initial fuel volume and a subsequently injected main fuel volume such that the fuel of the initial fuel volume is reflected by the impingement element on the piston back toward the injector and collides with the main fuel volume subsequently injected in the center of the combustion chamber.

* * * * *